United States Patent [19]
Wheeler

[11] Patent Number: 5,563,865
[45] Date of Patent: Oct. 8, 1996

[54] COMPACT DISK TRANSPORT TRAY MOVED BY A DISK READING MECHANISM

[75] Inventor: Arthur R. Wheeler, Boca Raton, Fla.

[73] Assignee: International Business Machines Corporation, Armonk, N.Y.

[21] Appl. No.: 492,884

[22] Filed: Jun. 20, 1995

Related U.S. Application Data

[63] Continuation of Ser. No. 178,161, Jan. 6, 1994, Pat. No. 5,473,593.

[51] Int. Cl.⁶ .......................... G11B 17/04; G11B 33/02
[52] U.S. Cl. ...................................... 369/77.1; 360/99.07
[58] Field of Search ................................ 369/75.2, 77.1; 360/99.06, 99.07, 99.03, 99.02

[56] References Cited

U.S. PATENT DOCUMENTS

| | | | |
|---|---|---|---|
| 4,701,901 | 10/1987 | Imai | 369/75.2 |
| 5,119,357 | 6/1992 | Tsuruta et al. | 369/75.2 |
| 5,313,351 | 5/1994 | Lee | 360/99.07 |

FOREIGN PATENT DOCUMENTS

| | | |
|---|---|---|
| 62-183081 | 8/1987 | Japan . |
| 62-271245 | 11/1987 | Japan . |
| 63-10364 | 1/1988 | Japan . |
| 1-98160 | 4/1989 | Japan . |
| 1134749 | 5/1989 | Japan . |
| 1227284 | 9/1989 | Japan . |
| 3147562 | 6/1991 | Japan . |
| 4-61658 | 2/1992 | Japan . |

*Primary Examiner*—Stuart S. Levy
*Assistant Examiner*—William J. Klimowicz
*Attorney, Agent, or Firm*—Martin J. McKinley

[57] ABSTRACT

A CD-ROM drive unit includes a disk transport tray moved between an open position, in which a compact disk, exposed outside the drive unit, can be removed and replaced, and a closed position, in which data can be read. The drive unit also includes a disk reading mechanism, which rotates the disk, and which moves an optical sensor along the disk as required for reading information from the disk. Motions obtained from this disk reading mechanism are used to drive the disk transport tray between the positions. In a first version of the device, a spindle motor drive a spindle, on which a disk is placed, in a forward direction to effect reading data and in a reverse direction to effect movement of the disk transport tray. A one-way clutch is used to discriminate between driver directions, only operating a mechanism to move the tray when the spindle motor is driving in reverse. In a second version of the devise, a mechanism moving the tray is locked to a carrier moving the optical sensor after a solenoid causes a pawl to pivot.

7 Claims, 4 Drawing Sheets

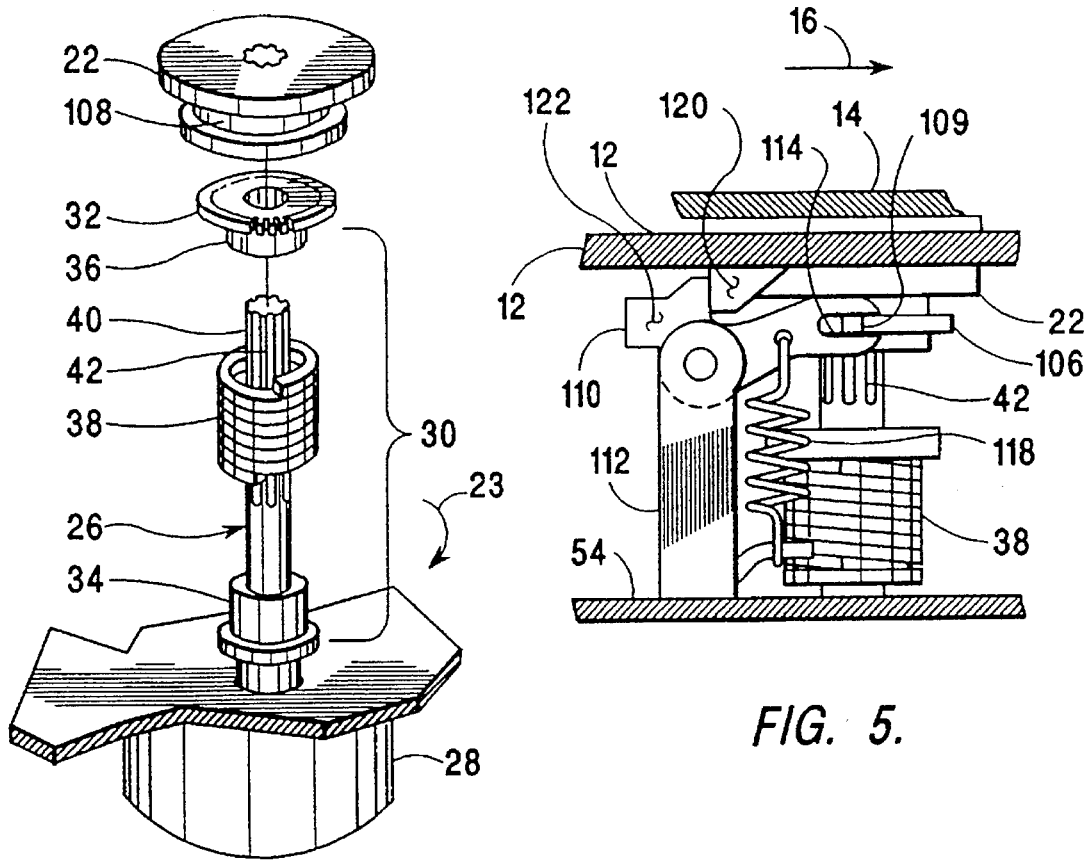
FIG. 2
FIG. 5.
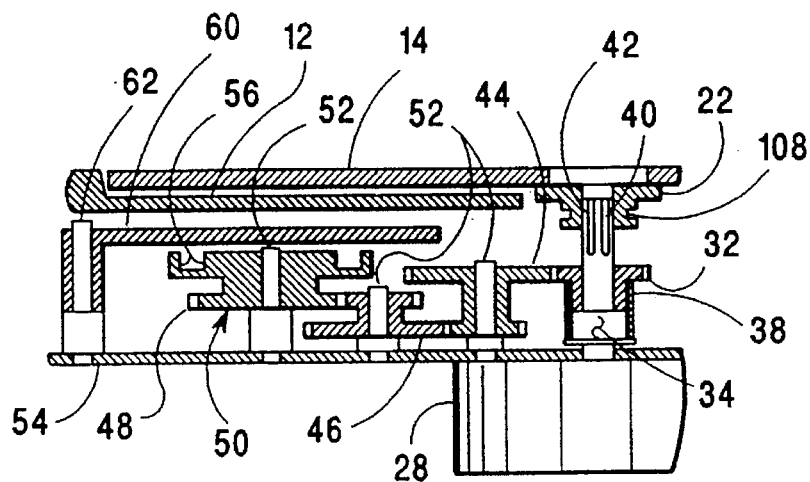
FIG. 3.

COMPACT DISK TRANSPORT TRAY MOVED BY A DISK READING MECHANISM

This application is a continuation of application Ser. No. 08/178,161, filed 6 Jan. 1994, now U.S. Pat. No. 5,473,593.

BACKGROUND OF THE INVENTION

1. Field of the Invention

This invention relates to a means for moving the tray receiving a compact disk in a CD-ROM drive, and more particularly to moving this tray by means a mechanism otherwise used to read data from the compact disk.

2. Background Information

The CD-ROM (Compact Disk-Read Only Memory) drive is becoming increasingly important as a data input means for personal computers. While this type of drive, using optically-read compact disks, provides a read only function, without providing a corresponding capability to write information on the system, the compact disks have a significant advantage of much greater storage capacity, up to 600 megabytes of information, than conventional magnetic disks.

The methods of handling the insertion and removal of the magnetic disks and compact disks into their respective types of drives are quite different. Magnetic disks are typically held within cartridges are inserted into a slot within the drive, to be latched in place when fully inserted. Within the cartridges, the disks are allowed to rotate and to move as required for centering on a drive mechanism. For example, 3.5-inch magnetic disk cartridges are inserted between two raised plates, which are dropped when the disk is fully inserted to engage the drive mechanism. To eject these cartridges, an ejection mechanism raises the plates to again align with the slot and pushes the cartridge partly out through the slot. The ejection mechanism is operated either manually, through the use of a mechanical pushbutton on the front of the drive, or electronically, through the use of a DC motor driving a pin to release a mechanism. In the case of electronic ejection, the ejection action may be started through an operator action, such as pushing an electrical button somewhere on the system, typing an eject command, or selecting an appropriate icon on the display screen.

On the other hand, in a CD-ROM drive, the compact disk is typically handled on a disk handling tray, which is moved outward for the removal or installation of a disk, and returned inward so that information on the disk can be read. Normally, in computer applications, the compact disk is handled directly, without being enclosed in a cassette. The CD-ROM drive also includes a spindle motor, which rotates the disk when it is installed within the drive, and an actuator motor, which moves an optical arrangement in a radial direction relative to the disk to accomplish the sequential reading of information on the compact disk. The movement of the disk handling tray is typically provided through the use of an additional motor, avoiding a reliance on the dynamics provided by the system user to load or unload the drive. However, to reduce both the initial cost of the drive and the space required for its components, what is needed is a means providing for movement of the tray through the use of a mechanical drive required for the reading of data stored on the disk.

SUMMARY OF THE PRIOR ART

U.S. Pat. No. 4,829,393 to Shimizu et al describes the use of the spindle motor as a driving source for ejecting a magnetic disk cartridge. A gear train extends between the spindle, which is driven by the spindle motor, and gear driving a roller against a tab extending from an ejection plate, the movement of which is used to effect the ejection of the disk cartridge. The spindle motor is driven in a forward direction to effect the rotation of the magnetic disk for reading or writing data, and in a reverse direction to operate the eject mechanism. One of the gears in the gear train is a pinion mounted to rotate in a slot in such a way that the forces exerted on the pinion as the spindle motor is driven in the forward direction disengage the pinion from the remaining portion of the drive train, while the forces exerted on the pinion as the spindle motor is driven in the reverse direction result in the engagement of the pinion with the remaining portion of the drive train, thus powering the ejection of the magnetic disk.

U.S. Pat. Nos. 4,245,266 to Baur and 4,723,185 to Maeda describe arrangements for using motion provided by the actuator (or magnetic head positioning) motor in the magnetic disk cartridge ejection process. A disadvantage of using the actuator motor, instead of the spindle motor, is that the actuator motor must be driven in both directions during normal operations reading and writing on the magnetic disk. Thus, with the actuator motor, the driving direction cannot be used, as taught by Shimizu, to discriminate between rotation which should be transmitted to the eject mechanism and rotation which should simply be used to provide the normal movements required for reading and writing data. Thus an alternate arrangement, such as driving a sliding element into a position beyond the position corresponding to the farthest magnetic track on the disk, is required to provide this discrimination.

U.S. Pat. No. 4,991,044 to Yanamoto et al. describes an eject mechanism for a magnetic disk drive in which the ejector is triggered under the power of the actuator (head driving motor), so that the disk cartridge is ejected under the power of the spindle motor.

While these patents describe a number of solutions for magnetic disk drives, they do not address the particular problems associated with the loading and unloading of compact disks into a CD-ROM drive. While a magnetic disk cassette is simply pushed outward in the ejection process, the compact disk loading tray must be opened and held at a fixed open position until an indication is provided by the user that the tray should be withdrawn into the drive, either with a new compact disk or in an empty condition. The drive means typically associated with CD-ROM drive loading and unloading must provide smooth dynamics and precise location functions, driving the compact disk into its loaded position under power, instead of relying on the user to push the disk into place. Therefore, what is needed is a method for driving the disk loading tray of a CD-ROM drive between loading and unloading positions without requiring the additional expense and space needed to support the use of a separate motor for this function.

SUMMARY OF THE INVENTION

In accordance with one aspect of the invention, there is provided a mechanism for reading data from a disk, including a sensor responsive to data stored on the disk, a data reading drive, a disk transport tray, a transmission, a cycle control circuit, and a cycle initiating device. The data reading drive provides relative motion between the sensor and the disk, making it possible to read data from various locations on the disk. The disk transport tray is moved between a fully closed position, in which data stored on the disk is read by the sensor, and a fully opened position, in which the disk is outwardly exposed for removal from the transport tray. The transmission directs motion from the data reading drive to the disk transport tray, causing the disk transport tray to be moved by the transmission means between the fully closed position and the fully open position. The cycle control circuit controls operation of the data reading drive and the transmission, upon receiving an initializing signal from the cycle initiating device, to move the disk transport tray from the fully closed position to the fully open position, or from the fully open position to the fully closed position.

BRIEF DESCRIPTION OF THE DRAWINGS

Preferred embodiments of the subject invention are hereafter described, with specific reference being made of the following drawings, in which:

FIG. 2 is an exploded isometric view of a shaft and clutch mechanism used to= transmit a rotational drive to a disk driving spindle and to operate the tray drive mechanism in the CD-ROM drive unit of FIG. 1;

FIG. 3 is a fragmentary cross-sectional elevation of the CD-ROM drive unit of FIG. 1, showing a first portion of the tray drive mechanism, taken as indicated by section lines III—III in FIG. 1;

FIG. 5 is a fragmentary cross-sectional elevation of the CD-ROM drive unit of FIG. 1, showing a mechanism for lifting the disk driving spindle to engage the compact disk, taken as indicated by section lines V—V in FIG. 1;

DETAILED DESCRIPTION

Figure 1:
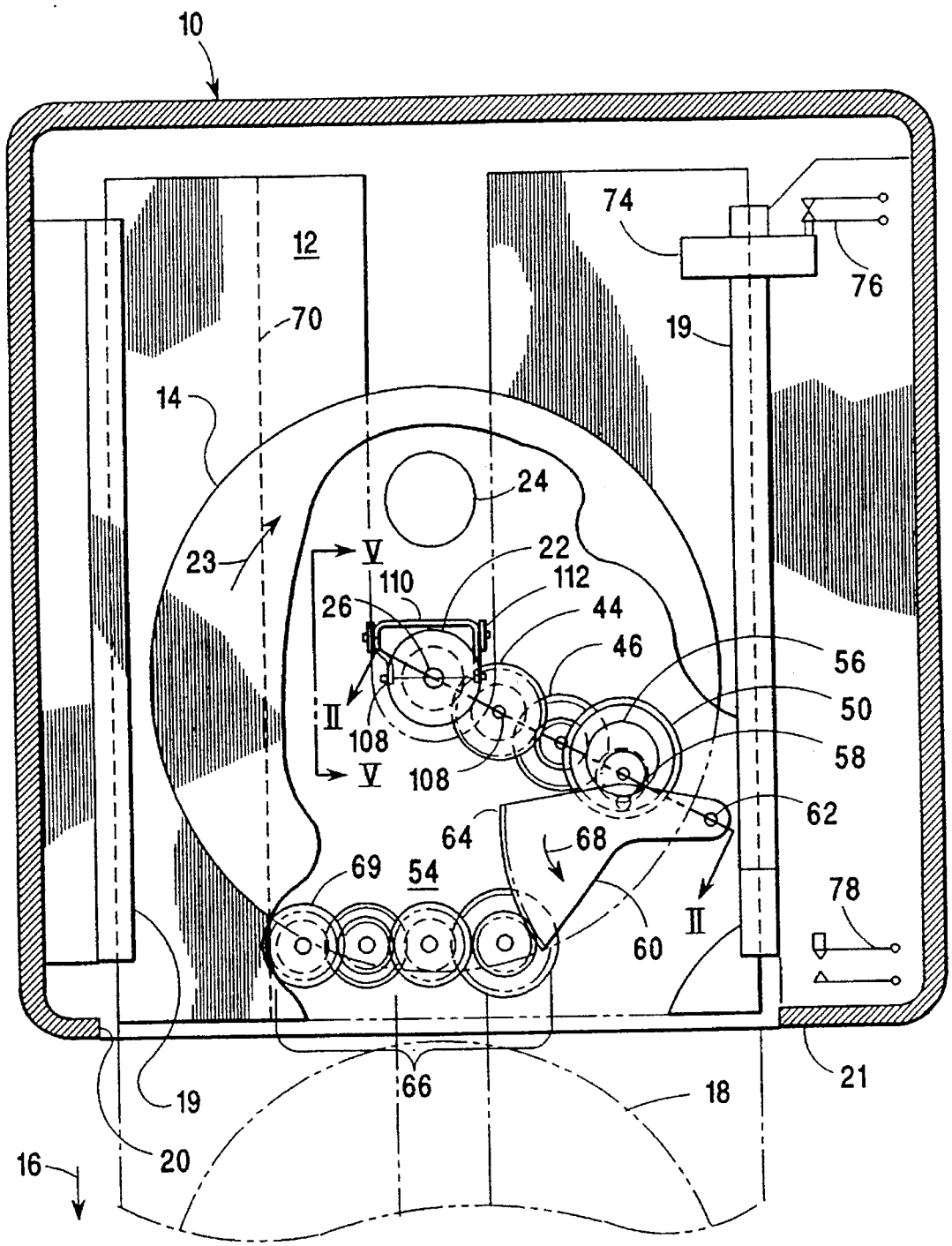
FIG. 1 is a plan view of a CD-ROM drive unit built in accordance with a first embodiment of this invention, with portions of compact disk and a tray on which it sits for loading and unloading cut away to show a tray drive mechanism underneath the tray.
Figure 4:
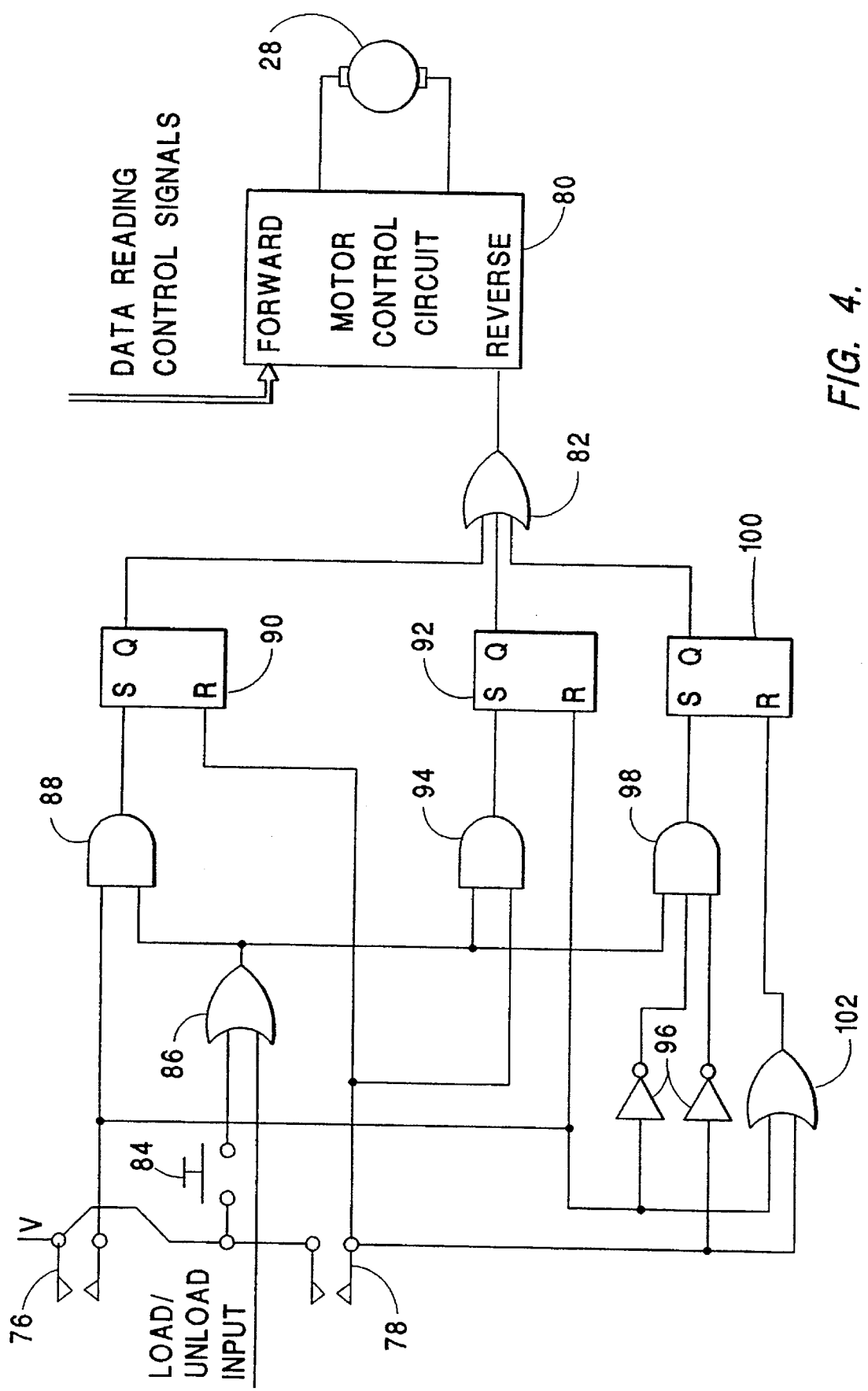
FIG. 4 is a schematic diagram of an electronic circuit for driving a spindle motor in the CD-ROM drive unit of FIG. 1.

FIGS. 1 through 4 show a first embodiment of the present invention, with FIG. 1 being a plan view, while FIG. 2 is an isometric view of a clutch mechanism used in the embodiment, while FIG. 3 is a fragmentary cross-sectional view showing particular portions of the mechanisms involved, and while FIG. 4 is a schematic diagram of an electronic circuit used in this embodiment.

Referring first to FIG. 1, a CD-ROM drive 10 includes a slidable disk transport tray 12 on which a compact disk 14 is placed for loading and unloading into the device 10. Specifically, the disk 14 is placed as shown for operation of the device 10 to read information from the disk. When the disk 14 is to be unloaded, the disk transport tray 12 is driven outward, in the direction of arrow 16, carrying the disk with it into the position indicated by dashed line 18. In this position, the portion of tray 12 carrying disk 18 is moved completely clear of the covers and other structures of the device 10, so the compact disk 14 carried by the disk transport tray can be easily removed and replaced, if desired. Disk transport tray 12 is mounted to slide, for example, within tracks 19, moving through a slot 20 in the cover 21 of drive 10.

During a compact disk reading operation, the compact disk 14 is rotationally driven by a spindle 22 in the direction of arrow 23, as information stored on the disk in the form of pits and lands is read through an optical system 24. As spindle 22 is rotated in the direction of arrow 23, optical system 24 is moved inward by another drive system (not shown in FIG. 1), so that all or any portion of a spiral "track" of information is read. As optical system 24 approaches the center of disk 14, the speed of rotation is increased, so that the "track" is read at the same rate regardless of the radial distance on disk 14 at which information is read. In-CD-ROM drive 10, rotational motion imparted to spindle 22 is also used to power the movement of disk transport tray 12 in either direction.

FIG. 2 is an exploded isometric view of a shaft and clutch mechanism used to direct rotational movement to both the disk drive spindle 22 and a gear train used to power the movement of disk transport tray 12. The rotational motion of spindle 22 is derived from the rotation of spindle drive shaft 26, which is in turn rotationally driven by spindle motor 28. To facilitate the reading of data from disk 14, spindle motor 28 drives shaft 26 in the direction of arrow 23; to effect the movement of disk transport tray 12, spindle motor 26 drives shaft 28 opposite the direction of arrow 23, engaging a one-way clutch 30 to drive clutch output gear 32.

Clutch 30 includes an input arbor 34 formed as an enlarged portion of spindle shaft 26 and an output arbor 36 formed as a hub extending from output gear 32, which is rotatably mounted on shaft 26. A clutch spring 38 is pressed onto input arbor 34 to turn with shaft 26. This spring 38, which is preferably a helically-wound spring having a rectangular cross-section, fits relatively loosely over output arbor 36. When shaft 26 is driven in the direction of arrow 23, any frictional torque developed between rotating clutch spring 38 and a stationary output arbor 34 tends to uncoil the spring 38, loosening and removing a grip between spring 38 and output arbor 36. On the other hand, when shaft 26 is driven in the direction opposite arrow 23, any frictional torque developed between rotating clutch spring 38 and a stationary output arbor 34 tends to coil the spring 38 more tightly, increasing the grip of output spring 38 on output arbor 36. Thus, when shaft 26 is driven in the direction opposite arrow 23, a stationary output arbor 36 is rapidly picked up and turned with the shaft. When shaft 26 is driven in the direction of arrow 23, relative to output arbor 36, the application of any torque supplied to the output arbor by spring 38 is quickly released, and the mechanism driven by output gear 32 is allowed to stop, for example by frictional drag.

Spindle 22 is mounted to slide on an end portion 40 of shaft 26. A number of splines 42 on this end portion 40 permit this sliding while assuring that spindle 22 rotates with the shaft regardless of the direction in which the shaft is driven.

FIG. 3 is a cross-sectional elevation showing a portion of the disk transport tray drive mechanism extending from clutch output gear 32. A first idler 44 engages clutch output gear 32, and a second idler 46 engages idler 44. A gear portion 48 of a cam 50 in turn engages second idler 48. Each idler includes a driven gear portion, by which the idler is driven from clutch output gear 32, and a driving gear portion, which drives the next gear portion along the gear train. In each case, the a driven gear portion of a relatively large diameter engages a driving gear portion of a relatively small diameter, so that the rotational speed of each gear stage is decreased, as the available torque is increased. While this gear train is shown as an example, the individual gear diameters and the number of gear stages may be varied to obtain a desirable combination of available torque and drive speed. Idlers 44 and 46, and cam 50 are mounted to turn on corresponding shafts 52 extending from a drive plate 54, on which spindle motor 28 is also mounted.

Referring again to FIG. 1, cam 50 includes a groove 56, which in which a roller 58 operates, being rotatably attached to a cam follower 60, which is in turn pivoted on a shaft 62. Cam follower 60 also includes a sector gear portion 64 which engages a second gear train 66. As cam 50 is rotated through a 180-degree angle from the position in which it is shown, cam follower 60 is pivoted in the direction of arrow 68. Within gear train 66, each idler is arranged so that a driven gear of a relatively small diameter engages a driving gear of a relatively large diameter; in this way the rotational speed of successive idlers is increased through the gear train, as the driving torque is increased. The final gear 69 in gear train 66 engages a rack 70 extending along a lower surface of disk transport tray 12 as a part thereof. The diameters of gears and the number of stages in gear train 66 are arranged so that, as cam 50 is rotated 180 degrees from the position in which it is shown, the movement of cam follower 60, transmitted through gear train 66, drives disk transport tray 12 in the direction of arrow 16 from the position in which it is shown to the fully open position, in which compact disk 14 is held as indicated by dashed line 18.

The clutch method of the present invention provides an advantage over the sliding pinion described in U.S. Pat. No. 4,829,393 to Shimizu et al, in that the present invention does not require the use of additional gears which rotate during the reading of data within CD-ROM drive unit 10. In this way, a potential source of vibration is avoided.

A pair of limit switches, closed by the motion of a tab 74 extending from disk transport tray 12 provide an indication of when tray 12 has reached either end of the desired motion, thereby indicating when rotation of spindle motor 28 in the reverse direction should be terminated. The closure of rear limit switch 76 indicates that the disk transport tray 12 is fully within the drive unit 10, positioning compact disk 14 as required for data reading operations. The closure of front limit switch 78 indicates that the tray 12 is fully extended for the manual removal and/or replacement of a compact disk 14. With this mechanism, the actual distance which can be travelled is determined by the motion provided by cam 50 through gear train 66; even in the event of failure of a limit switch, the mechanism will not attempt to drive tray 12 through a greater distance. Reliance on the accurate operation of limit switches 76 and 78 to establish the accurate positioning of disk transport tray 12 may be reduced by providing dwell portions in the profile of cam groove 56 around the two points occupied by roller 58 when cam follower 60 is at the extremes of its motion. Each such dwell-portion is an angular segment through which groove 56 is at a constant radius from the center of rotation of cam 50.

While limit switches 76 and 78 are shown as operated by a tab 74 extending from disk transport tray 12, it is understood that equivalent operation could be achieved using, for example, a pair of switches actuated by a second cam surface turning as a part of cam 50, with one such switch being closed as the cam is rotated to the position causing cam follower 60 to be held at the extreme of its motion in the direction of arrow 68, while the other such switch is closed as the cam is rotated to the position causing cam follower 60 to be rotated to the extreme of its motion opposite the direction of arrow 68.

FIG. 4 is a schematic representation of the circuit used to drive spindle motor 28. Referring to FIG. 4, motor 28 is driven in either direction by means of a motor control circuit 80. For example, if motor 28 is a permanent magnet DC motor, the direction of rotation may be reversed by reversing the polarity of the lines extending between control circuit 80 and the motor 28. A number of control lines associated with the data reading functions are directed into control circuit 80, providing signals to drive spindle motor 28 in the forward direction, i.e. in the direction of arrow 23 (shown in FIG. 1), to read data on a conventional compact disk. For example, control means are provided for driving motor 28 at a faster speed as the distance between optical system 24 and the center of disk 14 decreases. When an input signal to control circuit 80 is provided as an output signal of OR gate 82, spindle motor 28 is driven in the reverse direction, i.e. opposite the direction of arrow 23, to effect the movements of disk transport tray 12 (shown in FIG. 1), as described above.

The movement of disk transport tray 12 is initiated, for example, when the system user depresses a pushbutton 84, providing an input signal at supply voltage V to OR gate 86. From this point, the operation of the circuit depends on the position of disk transport tray 12. If tray 12 is fully within CD-ROM drive 10, rear limit switch 76 is closed, so an output signal from AND gate 88 sets first latch 90. The output signal of latch 90, provided as an input to OR gate 82, causes motor control circuit 80 to drive motor 28 in the reverse direction until forward limit switch 78 is closed, as tray 12 reaches the position in which it is fully extended, resetting first latch 90. On the other hand, if tray 12 is fully extended outward, as indicated by the closure of forward limit switch 78, when pushbutton 84 is depressed, the output signal of OR gate 86 sets second latch 92 through AND gate 94. The output signal of second latch 92 causes motor control circuit 80 to drive motor 28 in the reverse direction until rear limit switch 76 is closed, as tray 12 reaches the position in which it is fully withdrawn into drive 10, resetting latch 92. Furthermore, if neither limit switch 76 nor limit switch 78 is closed at the time pushbutton switch 84 is depressed, the outputs of both invertors 96, directed through AND gate 98 set third latch 100. This condition may be caused, for example, if an electrical power failure occurs while disk transport tray 12 is being moved. The output signal of third latch 100 causes motor control circuit 80 to drive motor 28 in the reverse direction until either limit switch 76 or 78 is closed to provide a reset signal through OR gate 102.

Pushbutton switch 84, which is used as described above to initiate the movement of disk transport tray 12, may be placed at any place on CD-ROM drive unit 10 where the pushbutton is accessible both with the disk transport tray holding a compact disk within the unit 10, or with the disk transport tray fully extended for changing a compact disk. Alternately or additionally, a pushbutton switch having this function may be placed elsewhere on the system. Furthermore, as previously mentioned, other means may be used to initiate a compact disk unloading or loading cycle. For example, an icon on the display screen may be chosen for this purpose. To this end, a load-unload signal is applied as an input to OR gate 86. This input is applied by the logic of the system unit to start the process, which then continues as described above.

FIG. 5 is a fragmentary cross-sectional elevation of CD-ROM drive unit 10 of FIG. 1, taken as indicated by section lines V—V in FIG. 1, showing a mechanism which may be employed for lifting the disk driving spindle 22 to engage the compact disk. This mechanism is also shown in the plan view of FIG. 1. As previously described in reference to FIG. 2, a spline arrangement is used between spindle 22 and shaft 26 to allow the spindle to slide on the shaft while ensuring that these parts rotate together. This arrangement allows a compact disk 14 to be brought into the drive 10 resting on a surface of disk transport tray 12, and to be lifted off tray 12 before the disk is spun to read data.

Referring to FIGS. 1 and 5, a thrust washer 106 is inserted in a groove 108 (shown in FIG. 3) within spindle 22, in such a way that, while spindle 22 is free to turn as thrust washer 106 is held stationary, the spindle is raised and lowered according to the vertical movement of the thrust washer. Thrust washer 106 includes a tab 109 extending outward on each side. A crank 110, pivotally mounted on a pair of tabs 112 extending upward from drive plate 54, engages these tabs 109 by means of a pair of slots 114. An extension spring 118, fastened between crank 110 and drive plate 54, pulls downward on crank 110 to hold spindle 22 out of contact with compact disk 14.

As disk transport tray 12 is brought fully into CD-ROM drive unit 10, in the direction opposite arrow 16, tray tab 120, which descends as a part of tray 12, contacts crank tab 122, which extends upward as a part of crank 110. The final part of the motion of tray 12 causes crank 110 to rotate against the force of extension spring 118, raising spindle 22 to lift disk 14 off the surface of tray 12. When tray 12 is moved outward, in the direction of arrow 16, the first portion of this motion releases crank 110 to rotate downward, setting disk 14 back down on the surface of tray 12.

Figure 6:
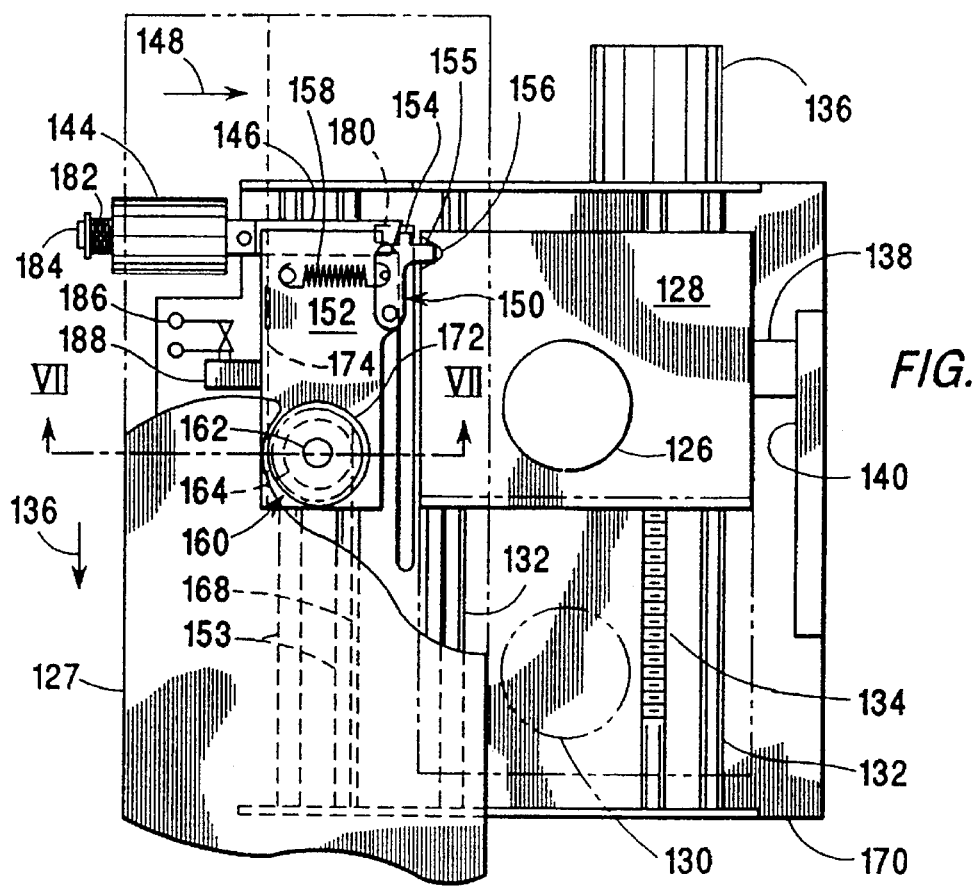
FIG. 6 is a fragmentary plan view of a CD-ROM drive unit built in accordance with a second embodiment of this invention, with portions of a tray on which a compact disk sits for loading and unloading cut away to show an alternate tray drive mechanism underneath the tray.
Figure 7:
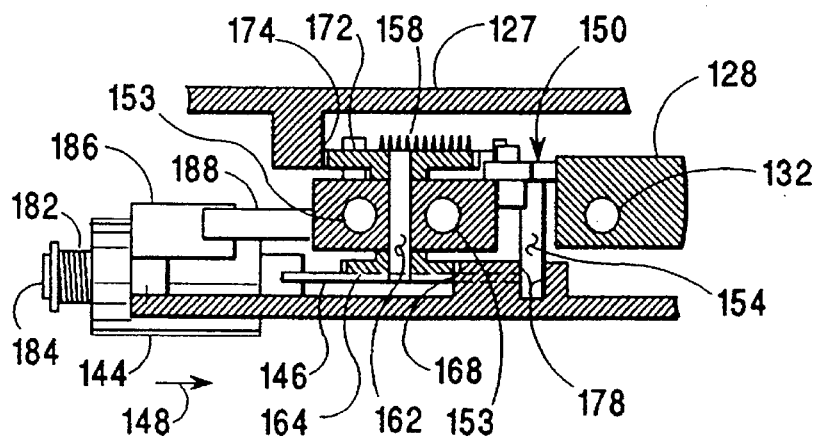
FIG. 7 is a fragmentary cross-sectional elevation of the CD-ROM drive unit of FIG. 6, showing a portion of the alternate tray drive mechanism, taken in the direction indicated by section lines VII—VII in FIG. 6.

FIGS. 6 and 7 show a second embodiment of the present invention, in which the drive mechanism moving an optical sensing device 126, instead of a spindle motor, is additionally used to move a disk transport tray 127. FIG. 6 is a plan view of this drive mechanism, while FIG. 7 is a cross-sectional elevation taken as indicated by section lines VII—VII in FIG. 6.

Referring first to FIG. 6, to facilitate reading information from a compact disk, optical sensing device 126 is moved from the position in which it is shown to the position indicated by dashed lines 130. The mechanism for moving this device 126 includes an optics carrier 128, on which the device 126 is mounted. This carrier 128 is be driven along two guide shafts 132 by means of a leadscrew 134 turned by actuator motor 136. Data indicating the position of optics carrier 128 is provided by a sensing mechanism 138 moved by carrier 128 adjacent to an emitter scale 140.

Unlike spindle motor 28 of the first embodiment, actuator motor 136 does not have a single direction of rotation during the reading of data from the compact disk. Actuator motor 136 is instead driven in one direction to move optical sensor 126 radially inward along the disk and in the opposite direction to move the sensor 126 outward along the disk. Therefore, reversing the direction of rotation of actuator motor 136 cannot be used to indicate that a cycle moving the disk carrying table should be started. Instead, at the beginning of each cycle to move disk transport tray 127 outward (in the direction of arrow 142), solenoid 144 is activated to push a link 146 in the direction of arrow 148. A pawl 150 is pivotally mounted atop a sliding block 152, which is configured to move beside optics carrier 128, along guide shafts 153.

Referring to FIG. 7 as well as FIG. 6, pawl 150 includes a downward-extending tab 154, which is moved in the direction of arrow 148 by this motion of link 146 due the activation of solenoid 144. The resulting rotation of pawl 150 drives tooth 155 of pawl 150 into an adjacent notch 156 in optics carrier 128, overcoming a force applied to pawl 150 by an extension spring 158. After this occurs, sliding block 152 moves with optics carrier 128, as long as pawl tooth 155 remains in engagement with notch 156.

A differential gear assembly 160 includes a shaft 162, mounted to rotate on sliding block 152, a lower gear 164 turning with shaft 162 in engagement with a rack 168 extending along a lower plate 170, and an upper gear 172 turning with shaft 162 in engagement with a rack 174 extending along a lower surface of disk transport tray 127. With this differential gear arrangement, the disk transport tray 127 is constrained to move with sliding block 152 at a higher speed of travel than the block 152. In this way the relatively short distance travelled by optics carrier 128 is used to generate a longer travel of disk transport tray 127, as needed to move a compact disk completely out of a CD-ROM drive unit to remove and replace the disk.

Downward extending tab 154 also extends into a groove 178 in lower plate 170, As sliding block 152 moves away from its rearmost position (in which it is shown), in the direction of arrow 136, this groove 178 holds pawl tooth 155 in engagement with notch 156, despite the fact that downward extending tab 154 moves away from the link 146 which initially caused the engagement of tooth 155 with notch 156. Thus, optics carrier 128 and sliding block 152 are held to move together through a cycle in which disk transport tray 127 is moved fully outward and returned fully inward, as directed by the rotation of actuator motor 136.

As disk transport tray 127 is pulled fully back into the CD-ROM drive unit, downward extending tab 154 moves into an end slot 180 extending from groove 178 in a direction opposite arrow 148, allowing subsequent movement of tab 154 in the direction opposite arrow 148, due to the force exerted on pawl 150 by extension spring 158. This movement disengages pawl tooth 155 from notch 156, so that subsequent movements of optics carriage 128 will not cause corresponding movements of sliding block 152. Furthermore, the engagement of tab 154 with end slot 180 latches sliding block 152 in its rearmost position, so that disk transport tray 127 is held in its rearmost position.

The system user may indicate a desire to remove or change compact disks, as described in reference to the first embodiment, by depressing an electrical pushbutton, by typing a command, or by selecting an icon. After any of these actions, actuator motor 136 is driven to move optics carrier 128 into its rearmost position. During both information reading operations and the movement of disk transport tray 127, motions of carrier 128 are tracked and controlled through a servomechanism using feedback provided by sensor 138. Thus, when sensor 138 indicates that carrier 128 has been moved fully to the rear, solenoid 144 is actuated to cause the engagement of sliding block 152 with carrier 128. Motor 136 is then activated to drive carrier 128 to its forwardmost position, as disk transport tray 127 is moved outward, so that a compact disk can be easily removed and/or inserted thereon. As soon as sensor 138 indicates that carrier 128 has travelled far enough that downward extending tab 154 has passed into the narrow part of groove 178, the power to solenoid 144 is dropped, so that link 146 is returned opposite the direction of arrow 148 by a compression spring 182 mounted on plunger 184 of solenoid 144.

The disk transport tray 127 stays in a fully open position until another indication is provided by the user, indicating that the tray should be closed. Such an indication may be given, for example, after the disk has been removed and replaced, if desired, or after a disk has been placed on a previously-empty tray. With this indication, actuator motor 136 is started to drive optics carrier 128 toward the rear. When optics carrier 128 is in its rearmost position, downward-extending tab 154 is pulled into end slot 180 as extension spring 158 pivots pawl 150. This action disengages pawl tooth 155 from notch 156 while locking sliding block 150 in place at its rearmost position until solenoid 144 is again actuated.

A limit switch 186, operated by a tab 188 extending as a part of sliding block 152, is closed by the movement of block 152 into its rearmost position. This switch indicates whether tray 127 is being moved with optics carrier 128 as the carrier 128 is moved away from its rearmost position. The condition of this switch 186 may be used, for example, to determine the operational state of a system after a power failure.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for reading data from a disk, said apparatus comprising:

a sensor responsive to data stored on said disk;

a data reading drive coupled to said sensor for providing relative motion between said sensor and said disk, wherein said relative motion effects reading data from various locations on said disk;

said data reading drive including a carrier moving with said sensor and a sensor drive for moving said sensor along said disk in a first direction and opposite said first direction between a first extreme motion limit and a second extreme motion limit;

a disk transport tray movable between a fully closed position, in which said data stored on said disk is read by said sensor, and a fully open position in which said disk is outwardly exposed for removal from said transport tray;

a transmission for directing motion from said data reading drive to said disk transport tray, wherein said disk transport tray is moved by said transmission between said fully closed position and said fully open position;

said transmission including means for coupling said disk transport tray to said sensor drive so that said disk transport tray is moved from said fully closed position to said fully open position as said sensor is moved from said first extreme motion limit to said second extreme motion limit;

a cycle control for controlling operation of said data reading drive and said transmission, wherein said disk transport tray in said fully closed position at a time of an initializing signal is moved to said fully open position, and wherein said disk transport tray in said fully open position at a time of said initializing signal is moved to said fully closed position; and cycle initiation means for providing said initializing signal;

wherein said means for coupling includes:

a slider movable along a path adjacent to said carrier;

tray drive means for moving said disk transport tray with said slider;

a latching pawl mounted on said slider and movable, when said disk transport tray is in said fully closed position, between a first pawl position, in which said slider is locked in place by said pawl and a second pawl position, in which said slider is locked by said pawl to move with said carrier;

a solenoid actuated when said sensor is at said first extreme motion limit, following operation of said cycle initiation means; and a link moved by the actuation of said solenoid to move said latching pawl from said first pawl position to said second pawl position.

2. The apparatus of claim 1, wherein said means for coupling additionally includes a pawl-blocking surface adjacent to a path along which said latching pawl is moved as said transport tray is moved between said fully closed position and said fully open position, said pawl-blocking surface preventing motion of said latching pawl from said second pawl position to said first pawl position when said disk transport tray is moved away from said fully closed position.

3. The apparatus of claim 1, wherein said tray drive means includes:

a tray driving rack extending along a surface of said disk transport tray parallel to a direction of movement of said disk transport tray;

a stationary rack extending along a stationary surface of said apparatus, parallel to said tray driving rack; and a differential gear assembly rotatably mounted on said slider, said differential gear assembly including a first gear engaging said stationary rack and a second gear engaging said tray driving rack.

4. The apparatus of claim 1:

wherein said sensor drive includes feedback means indicating a position of said sensor, said feedback means being used to control movement of said sensor during data reading operations and during movements of said disk transport tray;

wherein said cycle control causes said sensor drive to move said sensor to said first extreme motion limit after said initializing signal is provided;

wherein said cycle control causes said solenoid to be actuated following arrival of said sensor at said first extreme motion limit; and wherein said cycle control causes said sensor drive to move said sensor to said second extreme motion limit after actuation of said solenoid, with actuation of said solenoid being terminated as said sensor moves away from said first extreme motion limit.

5. The apparatus of claim 4:

wherein said apparatus additionally comprises a limit switch closed when said disk transport tray is in said fully closed position; and wherein said cycle control causes said sensor drive to move said sensor to said first extreme motion limit after said initializing signal is provided with said limit switch open.

6. Apparatus for reading data from a disk comprising:

a sensor;

a disk transport tray movable between a fully closed position, in which the data stored on the disk can be read by said sensor, and a fully open position in which the disk is outwardly exposed for removal from said transport tray;

a carrier, said sensor being coupled to said carrier;

drive means coupled to said carrier for moving said carrier and sensor along the disk between a first position and a second position; and selectable means for coupling said transport tray to said carrier so that said transport tray is moved from said fully closed position to said fully open position as said carrier is moved from said first position to said second position, such that said transport tray is not driven directly by said drive means, but indirectly through said carrier, wherein said selectable means for coupling includes:

a slider movable along a path adjacent to said carrier;

a latch mounted on said slider and movable between a third position in which said slider is locked in a storage position, and fourth position in which said slider is locked by said latch to move with said carrier;

a solenoid to move said latch from said third position to said fourth position.

7. The apparatus of claim 6, further comprising: a pawl-blocking surface adjacent to a path along which said latch is moved as said transport tray is moved between said fully closed position and said fully open position, said pawl-blocking surface preventing motion of said latch from said fourth position to said third position when said transport tray is moved away from said fully closed position.

* * * * *